(12) United States Patent
Jung

(10) Patent No.: US 8,432,049 B2
(45) Date of Patent: Apr. 30, 2013

(54) ELECTRICAL GENERATOR

(76) Inventor: Sukho Jung, Seongnam-si (KR)

( * ) Notice: Subject to any disclaimer, the term of this patent is extended or adjusted under 35 U.S.C. 154(b) by 389 days.

(21) Appl. No.: 12/836,733

(22) Filed: Jul. 15, 2010

(65) Prior Publication Data

US 2012/0013130 A1 Jan. 19, 2012

(51) Int. Cl.
*F03B 13/00* (2006.01)
*F03B 13/10* (2006.01)
*H02P 9/04* (2006.01)
*F02B 63/04* (2006.01)
*F03G 7/08* (2006.01)
*H02K 7/18* (2006.01)

(52) U.S. Cl.
USPC ............... 290/43; 290/1 R; 290/54; 336/200; 310/339

(58) Field of Classification Search .......... 290/1 R, 290/43, 54; 310/339; 336/200
See application file for complete search history.

(56) References Cited

U.S. PATENT DOCUMENTS

| | | | | |
|---|---|---|---|---|
| 3,581,129 A * | 5/1971 | Ganter et al. | | 310/25 |
| 3,686,520 A * | 8/1972 | Campagnuolo | | 310/15 |
| 3,726,004 A * | 4/1973 | Holland et al. | | 29/602.1 |
| 3,736,543 A * | 5/1973 | Lademann et al. | | 336/200 |
| 3,798,475 A * | 3/1974 | Campagnuolo et al. | | 310/15 |
| 4,024,409 A * | 5/1977 | Payne | | 290/55 |
| 4,184,805 A * | 1/1980 | Arnold | | 416/1 |
| 4,387,318 A * | 6/1983 | Kolm et al. | | 310/330 |
| 4,396,852 A * | 8/1983 | Hunt | | 310/329 |
| 4,494,100 A * | 1/1985 | Stengel et al. | | 336/200 |
| 4,536,674 A * | 8/1985 | Schmidt | | 310/330 |
| 4,627,294 A * | 12/1986 | Lew | | 73/861.05 |
| 5,223,763 A * | 6/1993 | Chang | | 310/339 |
| 5,521,573 A * | 5/1996 | Inoh et al. | | 336/180 |
| 5,621,264 A * | 4/1997 | Epstein et al. | | 310/339 |
| 5,801,475 A * | 9/1998 | Kimura | | 310/319 |
| 6,011,346 A * | 1/2000 | Buchanan et al. | | 310/339 |
| 6,236,297 B1 * | 5/2001 | Chou et al. | | 336/200 |
| 6,351,999 B1 * | 3/2002 | Maul et al. | | 73/861.22 |
| 6,424,079 B1 * | 7/2002 | Carroll | | 310/339 |
| 6,498,555 B1 * | 12/2002 | Sakata | | 336/200 |
| 6,587,025 B2 * | 7/2003 | Smith et al. | | 336/200 |
| 7,148,591 B2 * | 12/2006 | Mizoguchi et al. | | 310/36 |
| 7,164,255 B2 * | 1/2007 | Hui | | 320/108 |
| 7,199,480 B2 * | 4/2007 | Fripp et al. | | 290/1 R |
| 7,208,845 B2 * | 4/2007 | Masters et al. | | 290/1 R |
| 7,298,238 B1 * | 11/2007 | Eaton et al. | | 336/200 |
| 7,456,722 B1 * | 11/2008 | Eaton et al. | | 336/200 |
| 7,535,148 B2 * | 5/2009 | Harris et al. | | 310/156.56 |
| 7,573,143 B2 | 8/2009 | Frayne | | 290/1 R |
| 7,612,569 B2 * | 11/2009 | Ushijima et al. | | 324/663 |
| 7,623,013 B2 * | 11/2009 | Lopatinsky et al. | | 335/299 |
| 7,626,281 B2 * | 12/2009 | Kawai | | 290/54 |
| 7,633,175 B1 * | 12/2009 | Wilson et al. | | 290/43 |

(Continued)

OTHER PUBLICATIONS

PESWiki.com—Pure Energy Systems Wiki, Directory: Humdinger Windbelt. Available online at http://peswiki.com/index.php/Directory:Humdinger_Windbelt, Oct. 20, 2008.

*Primary Examiner* — Pedro J Cuevas
(74) *Attorney, Agent, or Firm* — Maschoff Brennan

(57) ABSTRACT

An electrical generator is provided. The electrical generator includes a support, a magnetic material configured to be coupled to the support, and at least one flexible conductive member configured to include an electrical conductor associated with the magnetic material and to move in response to a fluid flow.

25 Claims, 6 Drawing Sheets

U.S. PATENT DOCUMENTS

| | | | |
|---|---|---|---|
| 7,772,712 B2* | 8/2010 | Frayne | 290/1 R |
| 7,795,763 B2* | 9/2010 | Harris et al. | 310/12.16 |
| 7,821,144 B2* | 10/2010 | Frayne | 290/1 R |
| 7,859,377 B2* | 12/2010 | Kawarai | 336/83 |
| 7,870,665 B2* | 1/2011 | Nomura et al. | 29/847 |
| 7,884,490 B1* | 2/2011 | Wilson et al. | 290/43 |
| 7,906,861 B2* | 3/2011 | Guerrero et al. | 290/1 R |
| 7,986,051 B2* | 7/2011 | Frayne | 290/1 E |
| 8,026,619 B2* | 9/2011 | Frayne | 290/1 R |
| 8,080,906 B2* | 12/2011 | Roberts et al. | 310/29 |
| 8,102,072 B2* | 1/2012 | Tsou | 290/55 |
| 8,193,781 B2* | 6/2012 | Lin et al. | 322/3 |
| 8,258,644 B2* | 9/2012 | Kaplan | 290/54 |
| 8,319,402 B1* | 11/2012 | Churchill et al. | 310/339 |
| 8,344,731 B2* | 1/2013 | Lee | 324/318 |
| 2005/0230973 A1* | 10/2005 | Fripp et al. | 290/1 R |
| 2005/0230974 A1* | 10/2005 | Masters et al. | 290/1 R |
| 2006/0202569 A1* | 9/2006 | Chen | 310/36 |
| 2007/0007827 A1* | 1/2007 | Harris et al. | 310/15 |
| 2007/0182419 A1* | 8/2007 | Ushijima et al. | 324/457 |
| 2008/0129254 A1* | 6/2008 | Frayne | 322/3 |
| 2008/0246346 A1* | 10/2008 | Harris et al. | 310/12 |
| 2008/0278008 A1* | 11/2008 | Roberts et al. | 310/29 |
| 2008/0297119 A1* | 12/2008 | Frayne | 322/3 |
| 2009/0051476 A1* | 2/2009 | Tada et al. | 336/105 |
| 2009/0146658 A1* | 6/2009 | McDowell et al. | 324/309 |
| 2009/0295163 A1* | 12/2009 | Frayne | 290/54 |
| 2011/0006868 A1* | 1/2011 | Banno et al. | 336/200 |
| 2011/0128109 A1* | 6/2011 | Tada et al. | 336/200 |
| 2011/0215590 A1* | 9/2011 | Arnold et al. | 290/1 R |
| 2012/0139389 A1* | 6/2012 | Bohringer et al. | 310/300 |
| 2012/0280516 A1* | 11/2012 | Moss | 290/1 R |
| 2012/0313639 A1* | 12/2012 | Lee | 324/307 |

* cited by examiner

ELECTRICAL GENERATOR

BACKGROUND

A wind power has been spotlighted as an attractive replacement to fossil fuel for an environmental reason such as a green house effect. A technique of wind power generation uses rotors to generate an electrical energy by wind. The technique for manufacturing, installing, or maintaining a wind power generator is generally complicated and expensive.

DETAILED DESCRIPTION

Figure 1:
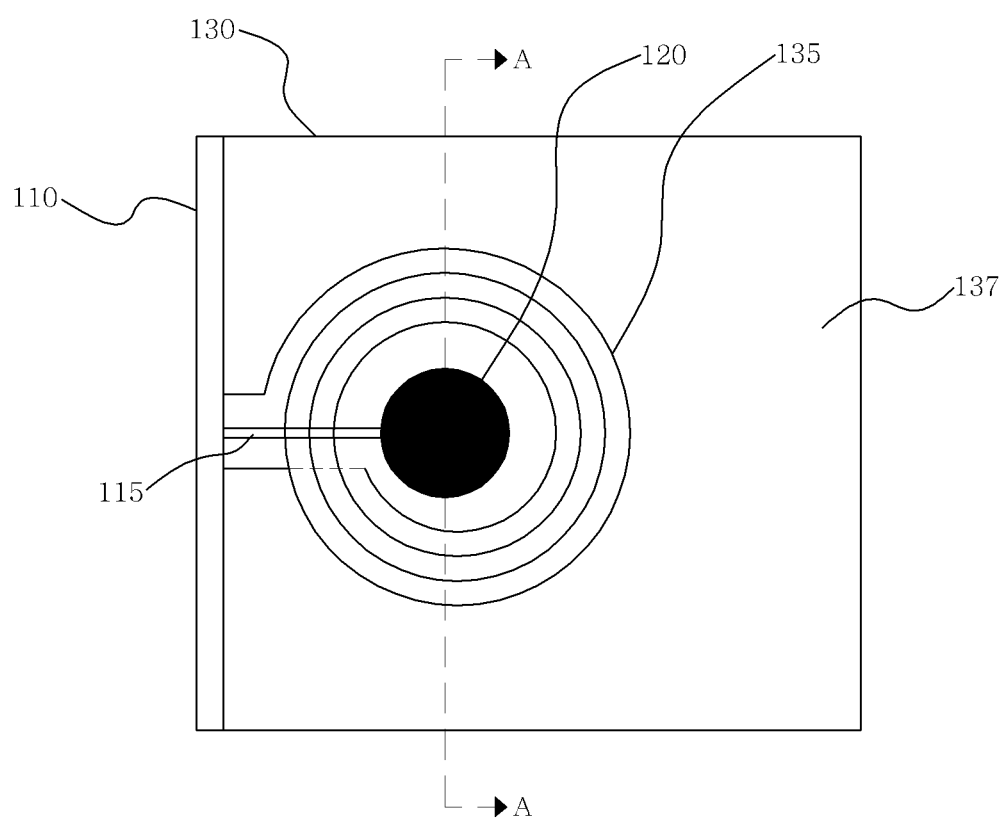
FIG. 1 is a schematic diagram showing an illustrative embodiment of an electrical generator.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In one illustrative embodiment, an electrical generator includes a support, a magnetic material configured to be coupled to the support, and at least one flexible conductive member configured to include an electrical conductor associated with the magnetic material and to move in response to a fluid flow. An end of the at least one flexible conductive member is coupled to the support.

Figure 2:
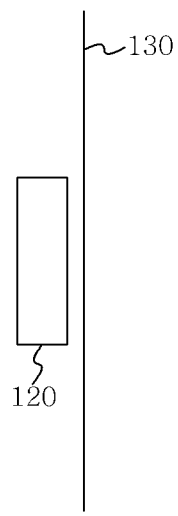
FIG. 2 is a sectional view taken along line A-A shown in FIG. 1.
Figure 3:
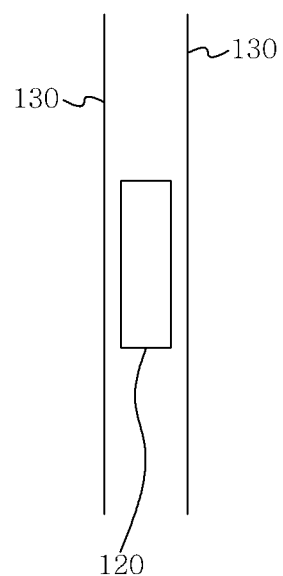
FIG. 3 is another sectional view taken along line A-A shown in FIG. 1.

FIG. 1 is a schematic diagram showing an illustrative embodiment of an electrical generator. FIG. 2 is a sectional view taken along line A-A shown in FIG. 1. FIG. 3 is another sectional view taken along line A-A shown in FIG. 1.

FIG. 1 illustrates that an electrical generator 100 includes a support 110, a magnetic material 120 configured to be coupled to support 110, and at least one flexible conductive member 130 configured to include an electrical conductor 135 associated with magnetic material 120 and a flexible film 137 moving in response to a fluid flow such as water flow, tidal flow, or air flow (e.g. wind). FIG. 1 further illustrates that one end of the at least one flexible conductive member 130 is coupled to support 110. For example, a left end (or right, upper or lower end) of the at least one flexible conductive member 130 may be wrapped around support 110, or inserted in a groove (not shown) formed in support 110.

Support 110 may be configured to support magnetic material 120 and at least one flexible conductive member 130. Support 110 may be made of any metal or metal compound such as steel, iron, copper, aluminum, magnesium, or their alloy, also any plastic such as polyethylene, polypropylene, polyvinyl chloride, polystyrene, polyethylene terephthalate, or acrylonitrile-butadiene-styrene resin, or wood, etc.

In one embodiment, support 110 may have a shape of rod or bar. In this case, support 110 may include a branch 115 configured to couple to magnetic material 120. Branch 115 may be made of the same material as support 110. For example, the length of branch 115 may be more or less than approximately 10, 15, or 20 centimeter (cm), and the thickness of branch 115 may be more or less than approximately 1, 2, or 3 cm, but not limited thereto. Branch 115 may be coupled to support 110 or formed together with support 110 in one body. For example, branch 115 may be formed by being inserted into a hole formed on the surface of support 110. By way of another example, one end of branch 115 may have a C-shaped or O-shaped inner space in which support 110 can be inserted. By way of still another example, support 110 may be configured to have a protrusion on a portion of its surface and the protrusion may be elongated in perpendicular to the longitudinal direction of support 110 to form branch 115. A free end of branch 115 may be coupled to magnetic material 120. For example, the free end of branch 115 may be coupled to magnetic material 120 by using an adhesive or formed to have a C-shaped or O-shaped inner space so that magnetic material 120 is inserted in the space, but not limited thereto. In another embodiment, support 110 may be a board having the shape of a triangle, a tetragon, or a pentagon, etc. In this case, support 110 may have a hole or recess (not shown) so that magnetic material 120 is inserted in the hole or recess. Although FIG. 1 illustrates that support 110 may be the same size as at least one flexible conductive member 130, it is apparent to those skilled in the art that support 110 may be bigger or smaller than at least one flexible conductive member 130.

Magnetic material 120 may be configured to include a permanent magnet to generate a magnetic field. For example, magnetic material 120 may be paramagnetic, ferromagnetic, ferrimagnetic, or diamagnetic material, etc. The diameter of magnetic material 120 may be, for example, less than approximately 10, 15, or 20 cm, but not limited thereto. FIG. 1 illustrates that magnetic material 120 has a circular shape, but not limited thereto, magnetic material 120 may have a square or rectangular shape and so on.

Flexible film 137 may be configured to generate a movement in response to the fluid flow, such as wind. By way of examples, flexible film 137 may include vinyl material (such as polyvinyl chloride, low-density polyethylene, polypropylene, and ethylene vinyl acetate), paper, or fabric, etc., without limitation. Flexible film 137 may be configured to move when subject to the fluid flow such as wind. Here, the term "movement" of flexible film 137 refers to vibrating, waving, shaking, oscillating, flapping, or fluttering of flexible film 137. By way of example, one free side of flexible film 137 may move up and down or from side to side with small movements (e.g., high or low amplitude or frequency), while an opposite side of flexible film 137 is held in support 110. In one embodiment, flexible film 137 can be extended and move in the air flow, e.g., the wind having a speed more than 12 km/h. It is well known to those skilled in the art that, at the wind speed range corresponding to level three of the Beaufort wind force scale is 12 to 19 km/h, small objects (e.g., tree leaves, small twigs, or flag) can constantly move and be extended.

In one embodiment, flexible film 137 may be configured to have a size appropriate for moving in the fluid flow. For example, the size of flexible film 137 may be 20 by 15 cm, 25 by 20 cm, or 30 by 25 cm, but not limited thereto. Flexible film 137 may have a square, rectangular, or triangular shape, without limitation.

Electrical conductor 135 may be configured to be conductively or electromagnetically coupled to magnetic material 120. Electrical conductor 135 may not necessarily contact magnetic material 120. For example, electrical conductor 135 may be configured to surround magnetic material 120. Particularly, electrical conductor 135 may have a shape such that a current can be generated by relative movement of electrical conductor 135 with respect to magnetic material 120. The relative movement and the generation of the current will be described in detail hereinafter. By way of example, FIG. 1 illustrates that a coil shape of electrical conductor 135 surrounds magnetic material 120 having a circular shape. By way of another example, electrical conductor 135 may have a square or rectangular shape to surround magnetic material 120 having a square or rectangular shape. It is apparent to those skilled in the art that the shape of electrical conductor 135 can be variable depending on the shape of magnetic material 120.

In one embodiment, electrical conductor 135 may include conductive material such as metal (such as copper, silver, and aluminum, etc.) or conductive ink made of metallic particles such as silver or copper flakes, or carbon flakes/particles. Electrical conductor 135 may be a conductive ink printed on flexible film 137 in a coil shape or a coil-shaped thin film of copper or aluminum attached on flexible film 137. For example, electrical conductor 135 may be formed by printing the conductive ink on flexible film 137 in a coil shape, or by attaching a coil made from a thin film of copper or aluminum on flexible film 137. However, it is not limited thereto. The diameter of the coil may be, for example, more or less than approximately 10, 15, or 20 cm, but not limited thereto.

As described above, magnetic material 120 may be associated with electrical conductor 135 of at least one flexible conductive member 130 without contacting electrical conductor 135. By way of example, FIG. 2 illustrates magnetic material 120 facing one surface (e.g., a front or rear surface) of at least one flexible conductive member 130. Although not shown in FIG. 2, magnetic material 120 may be placed to be adjacent to electrical conductor 135 of at least one flexible conductive member 130. By way of examples, magnetic material 120 and electrical conductor 130 may be placed in parallel to each other.

In some embodiments, magnetic material 120 may be placed between two flexible conductive members 130. By way of examples, FIG. 3 illustrates a pair of flexible conductive members 130 are positioned such that each flexible conductive member faces each surface of magnetic material 120. Although FIGS. 2 and 3 illustrate that at least one flexible conductive member 130 may be configured to be spaced apart from magnetic material 120, it is apparent to those skilled in the art that at least one flexible conductive member 130 and magnetic material 120 may be configured to contact to each other.

In one embodiment, support 110 may be coupled to an immovable object, such as a ground, a building or any structure capable of supporting or holding support 110. Bearings (not shown) may be interposed between support 110 and the immovable object for supporting support 110 and enabling support 110 to rotate with respect to the immovable object. Since support 110 can freely rotate although it is coupled to the immovable object, at least one flexible conductive member 130 associated with support 110 can be free to rotate in the direction of the fluid flow.

When flexible film 137 is subject to the fluid flow, for example, it moves from side to side repeatedly, and, then, electrical conductor 135 disposed on flexible film 137 can move according to the movement of flexible film 137. The movement of electrical conductor 135 may include vibrating, oscillating, waving, or shaking, etc. The movement of electrical conductor 135 caused by the fluid flow changes the position of electrical conductor 135 relative to magnetic material 120. Here, the term "relative position" of electrical conductor 135 refers to variable position of electrical conductor 135 with respect to magnetic material 120. The changes of relative position of electrical conductor 135 affects the magnetic field experienced by electrical conductor 135, which in turn changes magnetic flux acting on electrical conductor 135 and induces current on electrical conductor 135 according to Faraday's law of induction, which is well known to those skilled in the art.

Figure 4:
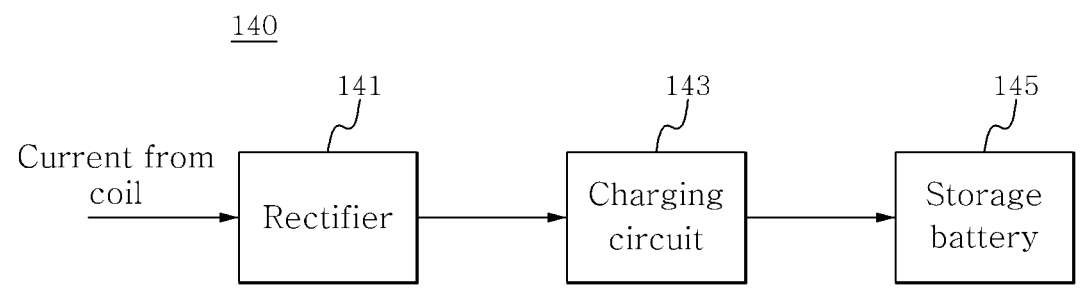
FIG. 4 is a schematic diagram showing an illustrative embodiment of a power circuit storing currents generated by electrical generator shown in FIG. 1.

In one embodiment, electrical generator 100 may further include a power circuit 140 shown in FIG. 4. FIG. 4 is a schematic diagram showing an illustrative embodiment of power circuit 140 storing currents generated by electrical generator 100.

FIG. 4 illustrates that power circuit 140 includes a rectifier 141, a charging circuit 143, and a storage battery 145 that are connected in sequence. Rectifier 141 may receive the alternating current (AC) generated by electrical conductor 135 and convert the AC into direct current (DC). In one embodiment, rectifier 141 may be made in a chip and mounted in at least one flexible conductive member 130, but not limited thereto.

Charging circuit 143 generates charging current using the DC from rectifier 141 and supplies the charging current to storage battery 145. In one embodiment, charging circuit 143 may include a smoothing circuit (not shown) that smoothes the DC from rectifier 141 and a filter (not shown) that removes noise from the DC supplied by rectifier 141.

Storage battery 145 may store the charging current supplied from charging circuit 143. In one embodiment, storage battery 145 may be connected to various electronic applications to supply power. Storage battery 145 may be any kind of batteries and may have any level of output voltage.

Power circuit 140 may be provided inside support 110, but not limited thereto, all or part of power circuit 140 may be located outside support 110.

In one embodiment, electrical generator 100 may use a variety of fluid flow such as water flow and tidal flow as well as air flow. Electrical generator 100 may be placed under the river or the ocean. In this case, at least one flexible conductive member 130 moves by the water flow or the tidal flow and then electrical conductor 135 moves. Therefore, electrical generator 100 can generate current in the water flow or the tidal flow in the substantially same way electrical generator 100 generates current in air flow such as wind.

Electrical generator 100 may be manufacture with low cost and may be also adaptable to small fluid flow power due to the simple structure and the small size of electrical generator 100 as shown in FIG. 1. In addition, electrical generator 100 may be easily installed, for example, by inserting support 110 into a hole formed on the immovable object, and use as well as easy maintenance and repair.

In another illustrative embodiment, two or more electrical generators may be used to generate an electrical energy. By way of examples, a plurality of electrical generators may be arranged on one frame to generate an electrical energy in response to a fluid flow applied to the frame. Each of the electrical generators may include a magnetic material and at least one flexible conductive member, as described above with respect to FIG. 1. Such embodiment will be described in detail hereinafter with respect to FIGS. 5-7.

Figure 5:
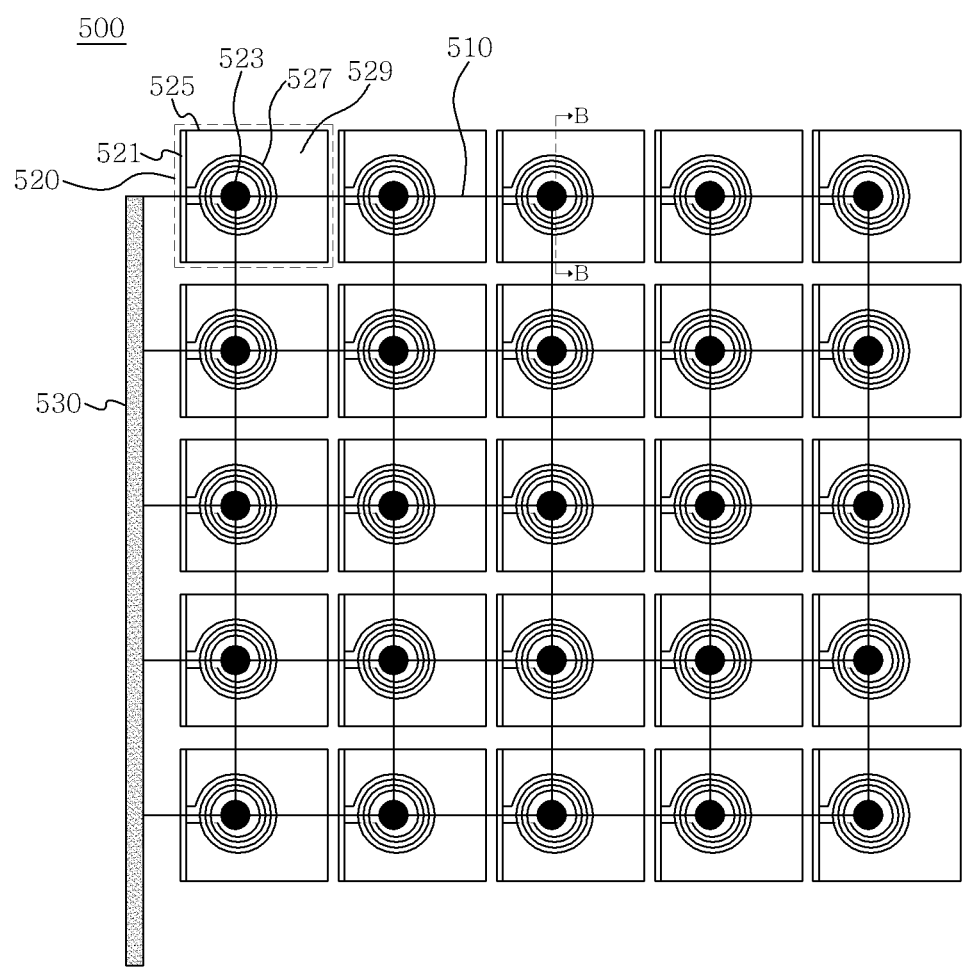
FIG. 5 is a schematic diagram showing another illustrative embodiment of an apparatus to generate an electrical energy.
Figure 6:
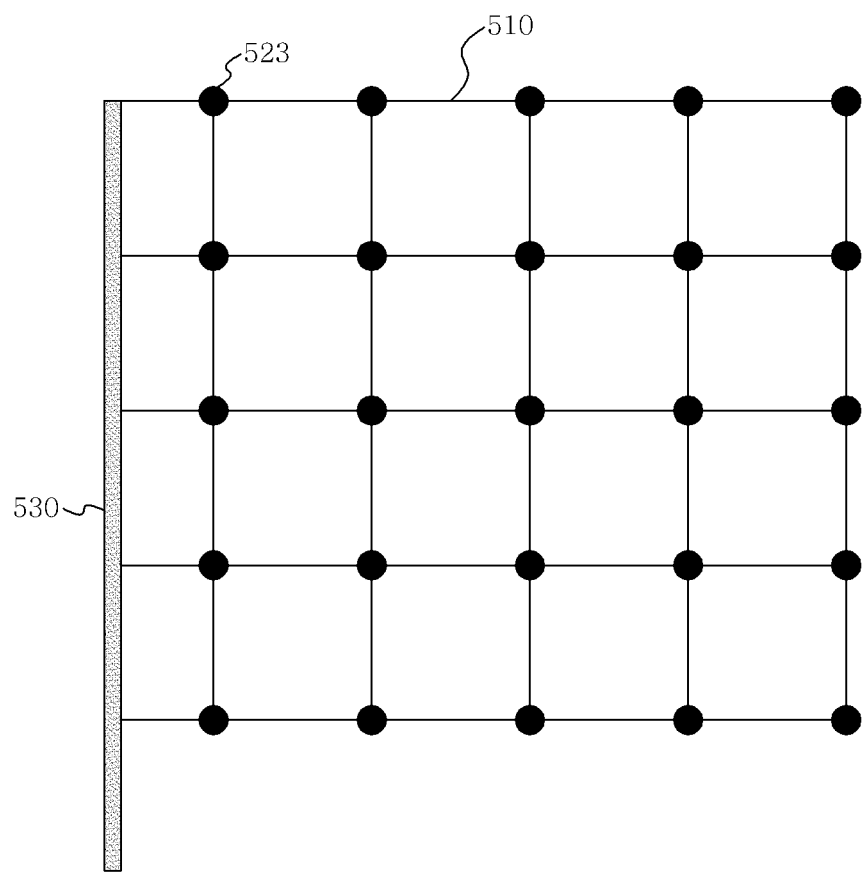
FIG. 6 is a schematic diagram of the frame shown in FIG. 5.
Figure 7:
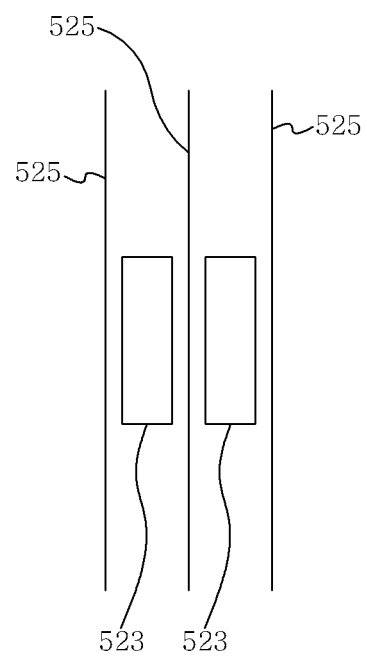
FIG. 7 is a sectional view taken along line B-B shown in FIG. 5.

FIG. 5 is a schematic diagram showing another illustrative embodiment of an apparatus to generate an electrical energy. FIG. 6 is a schematic diagram of the frame shown in FIG. 5. FIG. 7 is a sectional view taken along line B-B shown in FIG. 5.

FIG. 5 illustrates that an apparatus 500 includes multiple electrical generators 520 arranged on a frame 510 in a matrix, for example, a 5×5 matrix. Although FIG. 5 illustrates 5×5 matrix arrangement, it is apparent to those skilled in the art that frame 510 can have different matrix-arrangement, such as a 3×3 matrix or 6×6 matrix, depending on a desired layout. FIG. 5 further illustrates that each electrical generator 520 includes a support 521 (for example, first support), a magnetic material 523, and at least one flexible conductive member 525 configured to be coupled to first support 521. FIG. 5 still further illustrates that at least one flexible conductive member 525 includes an electrical conductor 527 electrically associate with magnetic material 523 and a flexible film 529 moving in response to the fluid flow.

Since each electrical generator 520 is substantially similar or identical to electrical generator 100, the detailed description for the similar or identical parts will be omitted for the simplicity of the description.

In one embodiment, frame 510 may be made of any metal or metal compound such as steel, iron, copper, aluminum, magnesium, or their alloy, any plastic such as polyethylene, polypropylene, polyvinyl chloride, polystyrene, polyethylene terephthalate, or acrylonitrile-butadiene-styrene resin, or wood, without limitation, and be one of a net-type frame and a jungle gym-type frame. For example, FIGS. 5 and 6 illustrate a net-type frame 510 having five columns and five rows, but not limited thereto.

In one embodiment, each magnetic material 523 may include a permanent magnet to generate a magnetic field and magnetic materials 523 may be spaced apart from each other. FIGS. 5 and 6 illustrate that magnetic materials 523 are disposed on intersections of frame 510 such that each magnetic material 523 can be electrically associated with at least one flexible conductive member 525. The intersections of frame 510 may be formed to have a C-shaped or O-shaped inner space so that magnetic material 523 is inserted in the space, but not limited thereto. FIGS. 5 and 6 further illustrate that magnetic materials 523 are arranged in a 5×5 matrix, but not limited thereto, and the number of magnetic materials 523 may be more or less according to a desired capacity of power generation. In another embodiment, magnetic material 523 may be coupled to not frame 510 but first support 521. In this case, first support 521 may include a branch (not shown) like branch 115 shown in FIG. 1, and magnetic material 523 may be coupled to the branch, as described above.

In one embodiment, flexible film 529 may be configured to generate a movement in response to the fluid flow. Flexible film 529 may include vinyl material, paper, or fabric, without limitation, as described above.

In one embodiment, electrical conductor 527 may include conductive material such as metal or conductive ink and be a conductive ink printed on flexible film 529 in a coil shape or a coil-shaped thin film of copper or aluminum attached on flexible film 529, as described above. Electrical conductor 527 may move according to the movement of flexible film 529 in the fluid flow.

In one embodiment, first support 521 may be made of metal, plastic, or wood, without limitation, and coupled to an end of at least one flexible conductive member 525. First support 521 may be coupled to frame 510. In the embodiment that magnetic material 523 is coupled to the intersection of frame 510, first support 521 is coupled to frame 510 such that at least one flexible conductive member 525 can face or be adjacent to magnetic material 523, and, thus, at least one flexible conductive member 525 can be electrically associated with magnetic material 523. By way of example, at least a portion of first support 521 may be coupled to frame 510 by a fastener such as bolt, nut, and screw, without limitation. A variety of methods may be used to attach first support 521 to frame 510. In one embodiment, first support 521 may have a structure (such as buckle, clip, or groove joint structure) that can be detachably attached to frame 510. For example, frame 510 and first support 521 may be formed to have a groove or recess and a protrusion, respectively. Therefore, first support 521 can be detachably attached to frame 510 by pushing the protrusion in the groove or recess and by picking the former out of the latter. Since electrical generator 520 is coupled to frame 510 by first support 521, a disabled electrical generator can be easily replaced with a new one by using the detachable first support.

In one embodiment, apparatus 500 may further include a support 530 (for example, second support) configured to couple to frame 510 by a fastener or welding. By way of examples, FIG. 6 illustrates that second support 530 is coupled to a portion of frame 510 in a column direction. Second support 530 may be made of any metal or metal compound such as steel, iron, copper, aluminum, magnesium, or their alloy, any plastic such as polyethylene, polypropylene, polyvinyl chloride, polystyrene, polyethylene terephthalate, or acrylonitrile-butadiene-styrene resin, or wood, without limitation. In one embodiment, one or more electrical cables may be provided inside or outside frame 510 and second support 530 to electrically connect electrical conductors 527 to a power circuit (for example, 140 shown in FIG. 4). Second support 530 may be coupled to an immovable object, such as a ground, a building or any structure capable of supporting or holding second support 530. Bearings (not shown) may be interposed between second support 530 and the immovable object for supporting second support 530 and enabling second support 530 to rotate. Therefore, frame 510 can be free to rotate to follow the direction of the fluid flow when the fluid flow direction changes.

In one embodiment, apparatus 500 may further include a power circuit, such as power circuit 140 shown in FIG. 4. As described above, power circuit 140 may include a plurality of rectifiers 141, a charging circuit 143, and a storage battery 145 that are connected in sequence. In this case, each rectifier 141 may be mounted in each flexible conductive member 525, but not limited thereto, rectifiers 141 may be attached to frame 510 or first supports 521. Each rectifier 141 may be connected to respective electrical conductor 527.

In one embodiment, two or more flexible conductive members 525 may be alternately stacked in series. By way of examples, FIG. 7 illustrates that electrical generator 520 includes three flexible conductive members 525 and two magnetic materials 523. Particularly, three flexible conductive members 525 may be stacked in series such that each magnetic material 523 may be interposed between two adjacent flexible conductive members 525. In this case, three flexible conductive members 525 may be coupled to three first supports 521 respectively and three first supports 521 may be connected each other. Thus, three or more magnetic materials 523 may be also stacked such that each magnetic material 523 may be interposed between two adjacent flexible conductive members 525. Accordingly, the number of flexible conductive members 525 is greater than the number of magnetic materials 523 by one. Since the stacked structure of electrical generator 100 provides the increased number of magnetic materials 523 and flexible conductive members 525 on a given area, an increased power generation capacity can be provided to various fields, such as home, factory, leisure industry, etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An electrical generator comprising:
   an elongate support;
   a magnetic material coupled to the elongate support, the magnetic material and the elongate support defining a plane; and
   at least one flexible member including a flexible film and an electrical conductor disposed on the flexible film, wherein;
   an end of the at least one flexible member is coupled to the elongate support;
   the electrical conductor is disposed on the flexible film such that the electrical conductor is substantially aligned with the magnetic material in an absence of fluid flow; and
   a portion of the at least one flexible member excluding the end is configured for out-of-plane movement relative to the plane in response to fluid flow.

2. The electrical generator of claim 1, wherein the at least one flexible member is configured to be apart from the magnetic material.

3. The electrical generator of claim 1, wherein the flexible film includes vinyl material, paper, or fabric.

4. The electrical generator of claim 1, wherein the electrical conductor includes a conductive ink printed on the flexible film in a coil shape or a coil-shaped thin film of copper or aluminum attached on the flexible film.

5. The electrical generator of claim 1, further comprising a bearing configured to be interposed between the elongate support and an immovable object.

6. The electrical generator of claim 1, further comprising a rectifier configured to be connected to the electrical conductor; and a storage battery configured to store an output current of the rectifier.

7. The electrical generator of claim 1, wherein the fluid flow is at least one of air flow, water flow, and tidal flow.

8. The electrical generator of claim 1, wherein the out-of-plane movement relative to the plane comprises movement having a component that is substantially orthogonal to the plane.

9. An apparatus to generate an electrical energy comprising:
a frame defining a plane; and
a plurality of electrical generators arranged on the frame and configured to generate an electrical energy in response to a fluid flow,
wherein each of the electrical generators includes:
an elongate support;
a magnetic material coupled to one or both of the frame or the elongate support; and
at least one flexible member including a flexible film and an electrical conductor disposed on the flexible film,
wherein for each of the electrical generators:
an end of the at least one flexible member is coupled to the elongate support;
the electrical conductor is disposed on the flexible film such that the electrical conductor is substantially aligned with the magnetic material in an absence of fluid flow; and
a portion of the at least one flexible member excluding the end is configured for out-of-plane movement relative to the plane in response to fluid flow.

10. The apparatus of claim 9, wherein out-of-plane movement of the portion of the at least one flexible member relative to the plane causes a change in a relative location of at least part of the electrical conductor with respect to the magnetic material.

11. The apparatus of claim 10, wherein the electrical conductor is configured to include a conductive ink printed on the flexible film in a coil shape or a coil-shaped thin film of copper or aluminum.

12. The apparatus of claim 10, further comprising a rectifier configured to be connected to the electrical conductor; and
a storage battery configured to store an output current of the rectifier.

13. The apparatus of claim 9, further comprising a frame support configured to support the frame.

14. The apparatus of claim 13, further comprising a bearing configured to be interposed between the frame support and an immovable object.

15. The apparatus of claim 9, wherein the elongate support of each of the electrical generators is detachably attached to the frame.

16. The apparatus of claim 9, wherein the magnetic materials and the at least one flexible members are alternately stacked in series.

17. The apparatus of claim 16, wherein a number of the at least one flexible conductive members is greater than a number of the magnetic materials by one.

18. The apparatus of claim 9, wherein the electrical generators are arranged on the frame in a matrix.

19. The apparatus of claim 9, wherein the out-of-plane movement relative to the plane comprises movement having a component that is substantially orthogonal to the plane.

20. The electrical generator of claim 1, wherein the fluid flow comprises air flow and the at least one flexible member is configured to extend from the elongate support while moving in air flow having a speed more than 12 kilometers per hour.

21. The electrical generator of claim 1, wherein the at least one flexible member has a surface area between about 300 centimeters squared (cm$^2$) and 750 cm$^2$.

22. The electrical generator of claim 1, wherein the at least one flexible member is configured to experience, in response to fluid flow, movement including at least one of vibrating, oscillating, waving, and shaking.

23. The apparatus of claim 9, wherein the fluid flow comprises air flow and the at least one flexible member is configured to extend from the elongate support while moving in air flow having a speed more than 12 kilometers per hour.

24. The apparatus of claim 9, wherein the at least one flexible member has a surface area between about 300 centimeters squared (cm$^2$) and 750 cm$^2$.

25. The apparatus of claim 9, wherein the at least one flexible member is configured to experience, in response to fluid flow, movement including at least one of vibrating, oscillating, waving, and shaking.

\* \* \* \* \*

UNITED STATES PATENT AND TRADEMARK OFFICE
CERTIFICATE OF CORRECTION

| | |
|---|---|
| PATENT NO. | : 8,432,049 B2 |
| APPLICATION NO. | : 12/836733 |
| DATED | : April 30, 2013 |
| INVENTOR(S) | : Jung |

It is certified that error appears in the above-identified patent and that said Letters Patent is hereby corrected as shown below:

In the Claims:

In Column 8, Line 43, in Claim 1, delete "wherein;" and insert -- wherein: --, therefor.

Signed and Sealed this
Ninth Day of July, 2013

Teresa Stanek Rea
*Acting Director of the United States Patent and Trademark Office*